United States Patent [19]

Murphy et al.

[11] Patent Number: 4,709,156
[45] Date of Patent: Nov. 24, 1987

[54] METHOD AND APPARATUS FOR INSPECTING A SURFACE

[75] Inventors: Stephan D. Murphy, Danville, Pa.; Thomas Derkacs, Cleveland, Ohio

[73] Assignee: Ex-Cell-O Corporation, Troy, Mich.

[21] Appl. No.: 802,700

[22] Filed: Nov. 27, 1985

[51] Int. Cl.⁴ ............................................. G01B 11/24
[52] U.S. Cl. ..................................... 250/560; 356/376
[58] Field of Search ................................ 250/560–563; 356/1, 376

[56] References Cited

U.S. PATENT DOCUMENTS

| | | | |
|---|---|---|---|
| 3,625,618 | 12/1971 | Bickel | 356/120 |
| 3,633,010 | 1/1972 | Svetlichny | 235/151.3 |
| 3,894,802 | 7/1975 | Higgins | 356/2 |
| 4,111,557 | 9/1978 | Rottenkolber et al. | 356/168 |
| 4,125,317 | 11/1978 | Gordon et al. | 356/376 |
| 4,171,917 | 10/1979 | Pirlet | 356/376 |
| 4,218,142 | 8/1980 | Kryger et al. | 356/394 |
| 4,226,536 | 10/1980 | Dreyfus et al. | 356/396 |
| 4,240,750 | 12/1980 | Kurtz et al. | 356/394 |
| 4,299,491 | 11/1981 | Waters et al. | 356/376 |
| 4,300,836 | 11/1981 | Holmes et al. | 356/376 |
| 4,381,152 | 4/1983 | Riech et al. | 250/560 X |
| 4,392,182 | 7/1983 | DiMatteo | 356/376 X |
| 4,593,967 | 6/1986 | Haugen | 356/376 X |
| 4,627,734 | 12/1986 | Rioux | 356/376 |
| 4,641,972 | 2/1987 | Halioua et al. | 356/376 |
| 4,657,394 | 4/1987 | Halioua | 356/376 |
| 4,673,817 | 6/1987 | Oomen | 356/376 X |

FOREIGN PATENT DOCUMENTS

| | | |
|---|---|---|
| 0092304 | 5/1984 | Japan . |
| 0197811 | 11/1984 | Japan . |
| 0212703 | 12/1984 | Japan . |
| 0117102 | 6/1985 | Japan . |

Primary Examiner—Eugene R. LaRoche
Assistant Examiner—David Mis
Attorney, Agent, or Firm—Edward J. Timmer

[57] ABSTRACT

An improved method and apparatus for inspecting the curved surface of a stationary article includes a mirror which is moved to direct a beam of light from a light source through a lens against each point of an arcuate series of points on a curved surface of the article. A second lens focuses beams of light reflected from the article onto a linear detector. The distance between locations at which the reflected light beams are focused on the linear detector corresponds to the distance at which points on the surface of the article are offset due to the curvature of the surface of the article.

9 Claims, 2 Drawing Figures

METHOD AND APPARATUS FOR INSPECTING A SURFACE

BACKGROUND OF THE INVENTION

The present invention relates to a method and apparatus for inspecting the surface on an article, such as an airfoil.

An apparatus for inspecting the surface of an airfoil is disclosed in U.S. Pat. No. 4,125,317. The apparatus includes a laser which directs light to a lens. The lens focuses the light on the surface of the airfoil. The airfoil is rotated to cause the light to be sequentially focused at each point in a series of points on the surface of the airfoil.

The light is reflected from the surface of the airfoil to a linear array of photodiodes. The location at which the reflected light is focused on the linear array of photodiodes indicates the location of a point on the surface of the airfoil. Since the airfoil must be rotated and has a significant mass, the time required to rotate and accurately position the airfoil with each increment of rotation limits the speed with which the curvature of the airfoil can be determined.

SUMMARY OF THE INVENTION

The present invention enables an article, such as an airfoil, to be quickly and easily inspected without moving the article. The inspecting of an article may include determining one or more dimensions of the article, the curvature of the surface of the article, and/or the locations of features on the article. To inspect the article, beams of light are directed against each point in a series of points on a stationary curved surface of the article. The beams of light are projected, in a predetermined order, toward the article along a plurality of paths which are vertically offset.

The beams of light are reflected from each of the points on the curved surface along paths which are horizontally and vertically offset. The amount of vertical offset of the reflected beams of light corresponds to the known distance which the beams of light were vertically offset when they were directed toward the article. The amount of horizontal offset of the reflected beams of light corresponds to the distance which points on the surface of the article are offset due to curvature of the surface of the article and due to the viewing angle.

The reflected beams of light are sequentially focused on a linear detector. During focusing of the reflected beams of light, the vertical offset between the reflected beams of light is eliminated. The horizontal offset between the reflected beams of light is maintained during focusing of the beams of light on the linear detector. The distance between the points at which the beams of light are focused along a straight line on the linear detector corresponds to the distance which the points on the surface of the article are offset due to curvature of the surface.

Accordingly, it is an object of this invention to provide a new and improved method and apparatus for inspecting the curved surface of an article and wherein beams of light are reflected from points on the curved surface of the stationary article to a stationary linear detector.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

General Description

Figure 1:
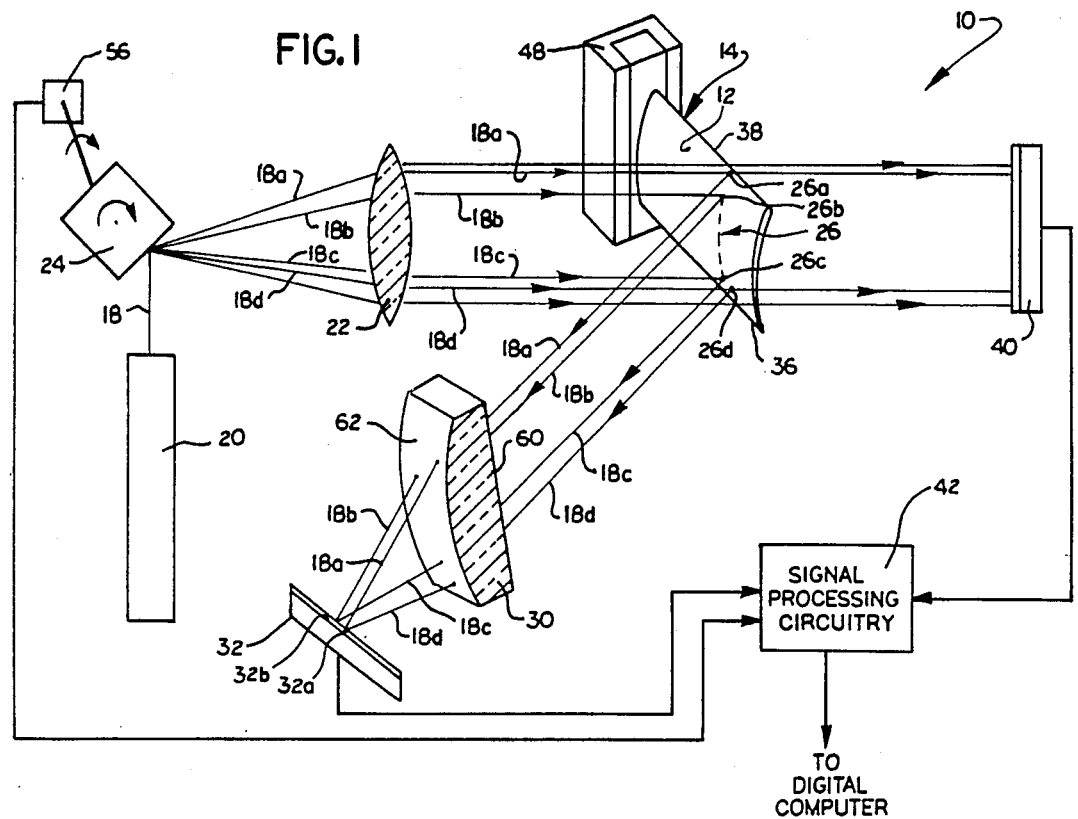
FIG. 1 is a schematic illustration of an apparatus constructed in accordance with the present invention to inspect the curved surface of a stationary article.

An apparatus 10 (FIG. 1), constructed and operated in accordance with the present invention, is used to inspect the curved surface 12 of an airfoil 14. The illustrated airfoil 14 is a blade which is used in a turbine engine. However, the apparatus 10 could be used to inspect curved surfaces on other three dimensional articles. As used herein the term curved surface includes surfaces having the smooth curvature of an airfoil or surfaces having a very irregular configuration.

During inspection of the airfoil 14, the curvature of the surface 12 is determined. In doing this, a beam 18 of light from a light source 20 is caused to move vertically across a spherical lens 22 by movement of a mirror 24. The lens 22 directs beams of light in a predetermined order against each point of a plurality of points disposed in an arcuate array 26 on the surface 12 of the airfoil 14. The light beams are reflected from each of the points in the arcuate array 26 in turn to a lens 30 which focuses the reflected light beams on a linear detector 32. In the illustrated embodiment of the invention, the light beam 18 is directed toward the surface 12 in a plane which is perpendicular to the surface. The light beam 18 is reflected from the surface 12 at an angle of 30 to 60 degrees from the path along which the light beam is directed toward the surface 12.

In order to detect the distance between leading and trailing edges 36 and 38 of the airfoil 14, a second linear detector 40 is positioned to receive light beams which clear the edges 36 and 38 of the airfoil. The output from the detectors 32 and 40 is transmitted to signal processing circuitry 42. The circuitry 42 transmits data to a digital computer which corrects for the viewing angle and provides an output indicative of the curvature of the surface 12 of the airfoil 14 and of the distance between the leading and trailing edges 36 and 38 of the airfoil.

In accordance with a feature of the present invention, the airfoil 14 is held stationary by a clamp 48 during scanning of the arcuate array 26 of points by the light beam 18. Thus, the light beam 18 scans the arcuate array 26 from the leading edge 38 to the trailing edge 36 while the airfoil 14 is stationary.

The scanning motion of the light beam 18 is obtained by moving the mirror 24 and focusing the moving light beam onto the surface 12 of the airfoil 14 with the lens 22. Thus, as the mirror 18 moves in a clockwise direction (as illustrated in FIG. 1), the light beam 18 is moved to direct a light beam 18a through the lens 22 to impinge against a first point 26a in the arcuate array 26 of points. Movement of the mirror 24 deflects the light beam 18 downwardly so that a second light beam 18b is directed by the lens 22 to impinge against a second point 26b in the arcuate array 26 of points on the curved surface 12 of the airfoil 14.

As the mirror continues to move, the light beam 18 is directed downwardly until a beam 18c impinges against a point 26c adjacent to the leading edge 36 of the airfoil and a lower end of the arcutate array 26. Finally, a light beam 18d is directed to and impinges against a lowermost or last point 26d in the arcuate array 26 of points on the surface 12 of the airfoil 14. It should be understood that although only points 26a–26d have been shown in FIG. 1 as being engaged by the light beams 18a–18d, a substantial number of points in the arcuate array 26 are disposed between the points 26b and 26c and these points are sequentially scanned by light beams projected along paths between the light beams 18b and 18c. Although it is preferred that a light beam be directed against one of the points 26 and then a light beam directed against an adjacent one of the points, a different order could be used if desired.

Since the scanning of the arcuate array 26 of points on the surface 12 of the airfoil 14 is accomplished by merely moving the relatively light mirror 24 and without moving the cmparatively heavy mass of the airfoil 14, the scanning of the arcuate array of points can be quickly accomplished. Since the airfoil 14 is not moved as the arcuate array 26 is scanned, there is no need to sequentially position the airfoil with each of the points in the arcuate array 26 in a predetermined location relative to a beam of light. Thus, the clamp 48 holds the airfoil 14 with the arcuate array 26 of points stationary in a predetermined position relative to the lens 22 so that rotation of the mirror 24 causes the light beam 18 to scan the arcuate array of points.

In accordance with another feature of the present invention, the curvature of the surface 14 is detected with a lienar detector 32. The linear detector 32 has a single series of photodiodes or pixels arranged along a straight line. Each of the photodiodes has a very small width as measured parallel to the straight line through the center of the linear array of photodiodes. The lens 30 is a rectangular cylindrical lens which focuses light beams 18a–18d onto the array of diodes in the linear detector 32 after the light beams have been reflected from the points in the arcuate array 26. Since there is only a single linear series of photo diodes in the detector 32, the detector can be quickly scanned or read electronically to determine which photodiode in the array of photodiodes is activated by a beam of light reflected from a particular point on the surface 12 of the airfoil 14.

Although the foregoing description relates to the inspecting of the curved surface of an airfoil, the apparatus 10 could be used to inspect the surface of an article having a substantially different configuration. This is because the lens 30 could be used to focus light from surfaces having many different configurations onto the linear detector 32.

It is contemplated that the present invention will be used to measure dimensions of various features on an article. Therefore, the inspecting of an article may include the measuring of one or more dimensions of the article. The spatial orientation of surfaces can also be determined while inspecting an article. For example, if the article has a corner, the orientation of surfaces on each side of the corner and the radius of curvature of the intersection could be determined and/or the location of a surface relative to some other feature could be determined. This is done by determining the locations of points in space in the same manner as in which the locations of the points 26a–26d are determined.

Inspecting the Airfoil

When the light beam 18 is reflected from the mirror 24, rotation of the mirror causes the light beam 18 to scan downwardly along a vertical path. The resulting light beams 18a–18d are vertically offset from each other. Although the light beams 18a–18d are vertically offset from each other, they are not initially offset in a horizontal direction. Therefore, the light beams 18a–18d, as projected from the lens 22, are disposed in a common vertical plane.

When the light beams 18a–18d sequentially impinge against the various points in the arcuate array 26 of points, the light beams are reflected from points which are located different distances from a chord to the airfoil 14. Thus, each of the points in the arcuate array 26 of points is located a different distance from a straight line between the leading and trailing edges 36 and 38 of the airfoil. The distance which the points in the arcuate array 26 are spaced from the straight line between the leading and trailing edges of the airfoil 14 is determined by the extent of curvature of the surface 12 of the airfoil. Thus, the further the surface 12 curves outwardly, the greater will be the distance be between a point on a central portion of the surface 12 and the chordal line.

When the light beams 18a–18d are sequentially reflected from the points in the arcuate array 26 of points, they are offset both vertically and horizontally. The vertical offset off the reflected light beams results from the scanning action of the mirror 24. This vertical offset is the same as the vertical offset which the light beams had immediately after they passed through the lens 22. Due to the curvature of the arcuate array 26 of points, the light beams 18a–18d which are sequentially reflected from the points are offset horizontally relative to each other by a distance which corresponds to the distance which the points are offset from the chordal line of the airfoil 14.

Since the airfoil 14 is being inspected to determine the extent of curvature of the surface 12, only the distance which the reflected light beams 18a–18d are offset in a horizontal direction is of interest. This is because the horizontal offset of the reflected light beams is caused by the curvature of the surface 12 of the airfoil 14. The vertical offset of the reflected light beams is not of interest since this distance is already known as a function of rotation of the mirror 24. Therefore, the lens 30 eliminates the vertical offset of the reflected light beams 18a–18d and focuses the reflected light beams along an imaginary straight line on the linear detector 32 at locations which are horizontally offset by distances determined only by the curvature of the surface 12 of the airfoil 14.

When the mirror 24 is in position to direct the light beam 18a against the first point 26a in the array 26 of points, the light beam 18a is reflected from the point 26a and passes through the lens 30 and is focused at a point 32a on the linear detector 32. Since the first point 26a in the array 26 of points is closest to or lies on the chordal line 44 (FIG. 2) of the airfoil surface 12, this point may be considered as a base or starting point for the curvature of the surface.

The next succeeding point 26b in the arcuate array 26 of points is spaced further from the chordal line 44 of the airfoil surface 12. When the light beam 18b is reflected from the point 26b, the reflected light beam 18b is offset both vertically and horizontally relative to the reflected light beam 18a. The vertical offset of the reflected light beam 18b relative to the reflected light beam 18a is the same as the vertical distance between the points 26a and 26b on the surface 12. The vertical offset of each of the light beams 18a and 18b is controlled and measured by the controls for the mirror 24. The distance which the reflected light beams 18a and 18b are horizontally offset corresponds to the distance by which the point 26b is spaced further from the chord of the airfoil surface 12 than the point 26a.

Figure 2:
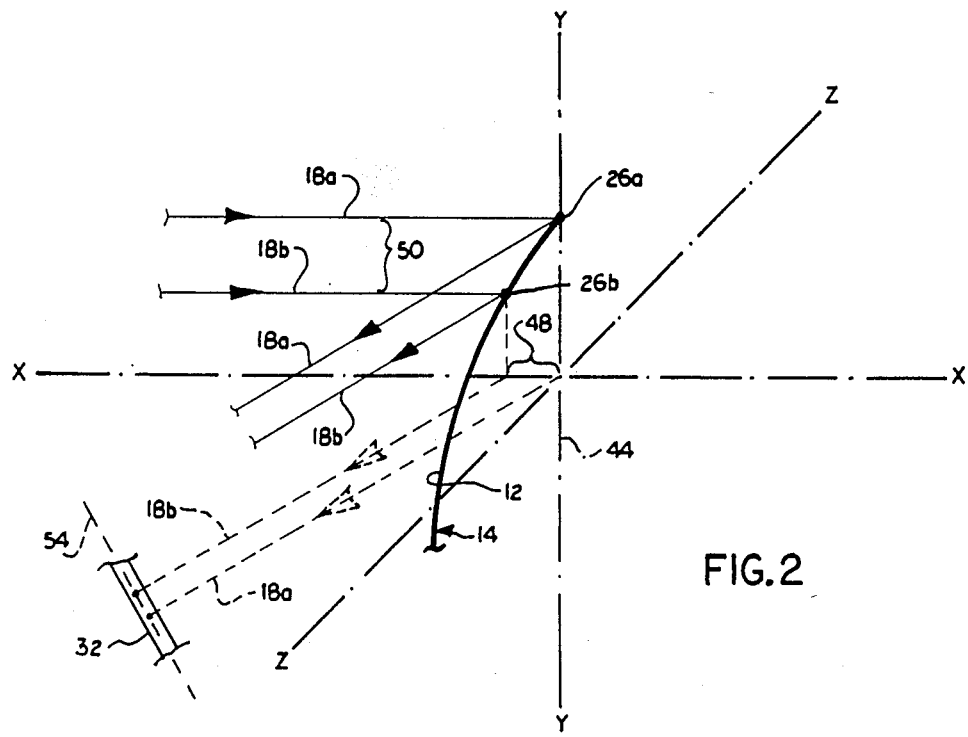
FIG. 2 is a highly schematicized illustration depicting the manner in which beams of light are offset relative to horizontal and vertical axes during inspection of the article.

The manner in which the light beams 18a and 18b are reflected from the surface 12 of the airfoil 14 has been indicated schematically in FIG. 2. The horizontal axis is considered as the X—X axis in FIG. 2 and the vertical axis is considered as the Y—Y axis. An axis extending perpendicular to both the X and Y axes is considered as being a Z—Z axis.

The light beams 18a and 18b, as projected from the lens 22, are offset along only the Y axis. Thus, the light beams 18a and 18b extend parallel to a horizontal plane containing the X and Z axes. If the light beams 18a and 18b could pass through the airfoil 14 they would both intersect the Y axis at vertically spaced apart points directly above the intersection of the X and Z axes.

The light beams 18a and 18b, as directed from the lens 22, engage the points 26a and 26b in the array 26 at locations which are offset along the X axis by a distance corresponding to the distance from the points 26a and 26b to the chordal line 44 of the surface 12. In the illustration of FIG. 2, the chordal line 44 is coincident with the Y axis. The point 26a in the arcuate array 26 is considered as being on the chordal line 44. Therefore, the point 26a, in the schematic illustration of FIG. 2, is disposed directly above origin, that is, the intersection of the X, Y and Z axes.

The light beam 18b engages the second point 26b in the arcuate array 26 of points. The point 26b is offset vertically downwardly along the Y axis toward the intersection of the X and Z axes (FIG. 2). The distance which the points 26a and 26b are offset along the X axis is indicated at 48 in FIG. 2. The distance 48 is equal to the distance from the point 26b to the chord line 44. The points 26a and 26b are also offset along the Y axis. The distance which the points 26a and 26b are offset along the Y axis is indicated at 50 in FIG. 2.

The reflected light beams 18a and 18b are offset both vertically and horizontally. The vertical offset 50 of the reflected light beams 18a and 18b corresponds to the known distance between the light beams 18a and 18b as they are projected from the lens 22. Therefore, the extent of the vertical offset between the reflected light beams 18a and 18b need not be measured and is eliminated by the lens 30.

The horizontal offset of the reflected light beams 18a and 18b, that is the distance indicated at 48 in FIG. 2, is indicative of the extent to which the point 26b is offset from the chordal line 44. Therefore, the distance 48 is indicative of the extent of curvature of the surface 12 between the points 26a and 26b. Since the distance 48 corresponds to the curvature of the surface 12, the lens 30 does not effect the extent of the horizontal offset of the reflected light beams 18a and 18b.

The lens 30 focuses the reflected light beams 18a and 18b at points 32a and 32b on a straight line 54 (FIG. 2) through the center of a photodiode array in the linear detector 32. This effectively results in the reflected light beams 18a and 28b being transmitted to the linear detector 32 from the X axis, in the manner indicated by the dashed lines 18a and 18b in FIG. 2. The distance between the points of impingement of the light beams 18a and 18b on the linear detector 32 corresponds to the distance 48 in FIG. 2.

The surface 12 continues to curve outwardly from the point 26b and then curves back inwardly to the point 26c (FIG. 2). Therefore, the light beams reflected from the points in the array 26 between the points 26b and 26c are focused on the linear detector 32 at increasing and then decreasing distances from the point 32b. The point 26c in the arcuate array 26 of points is offset from the chord line 44 by the same distance as the point 26b, that is by the distance 48 of FIG. 2. Therefore the reflected light beam 18c (FIG. 1) will be focused on the linear detector 32 at the same point as the reflected light beam 18b, that is at the point 32b. Since the last point 26d in the arcuate array 26 lies on the chord line 44 or is offset from the chord line by the same distance as the first point 26a, the reflected light beam 18d will be focused at the same point on the linear detector 32 as the reflected light beam 18a, that is at the point 32a.

Apparatus

The light source 20 is a commercially available laser and projects a light beam directly into the path of rotation of the mirror 24. Although the rotating mirror 24 has been illustrated in FIG. 1 as having only four planar surfaces, it is contemplated that the mirror will probably have more than four surfaces. In one specific embodiment of the invention, the mirror 24 was a model 36-12A which is available from Scanco Inc. of 4 Quincey Street, Norwalk, Conn. This specific mirror had 12 facets and was rotated at a speed of 3,600 rpm. Of course, a different mirror having fewer or less facets and rotating at a different speed could be used if desired. Also, a galvanometer type scanning mirror can be used if desired. An encoder 56 is connected with the mirror 24 and transmits a signal indicative of the exact position of the mirror 24 to the signal processing circuitry 42. A tachometer could be used in place of the encoder 56 if desired by relating speed to angular distance over a known time period.

In one specific embodiment of the invention, the lens 30 has a flat and vertically extending side surface 60. The side surface 60 of the lens 30 extends parallel to the Y axis of FIG. 2 and perpendicular to a plane containing the X and Z axes. The lens 30 has an arcuate side surface 62 which faces toward the linear detector 32. The lens 62 has a width, as measured parallel to the line 54 through the array of diodes in the linear detector 32, which is at least as great as the maximum distance which the arcuate array 26 of points is offset from the chord line 44. In one specific embodiment of the invention, the rectangular cylindrical lens was a model 44050 lens which was obtained from Oriel Corp. of 250 Long Beach Boulevard, Stratford, Conn. Of course, a different lens could be used if desired to focus the reflected light beams onto the linear detector 32.

The linear detector 32 has a horizontal central axis 54 which is disposed in the plane containing the X and Z axes in FIG. 2. The detector 32 has a linear array of photodiodes disposed along the axis 54. The length of the linear array of photodiodes is at least as great as the maximum distance between a point in the arcuate array 26 of points on the surface 12 of the airfoil 14 and the chord 44.

Each of the photodiodes in the linear array of photodiodes in the detector 32 has a very small dimension as measured along the axis 54. This is because the spacing between the photodiodes must be substantially less than the horizontal offset between the points in the array 26 of points on the surface 12 of the airfoil 14. In one specific embodiment of the invention, the linear detector 32 was a G Series Linear Array Model RL256G obtained from E G & G Reticon of 345 Potrero Avenue, Sunnyvale, Calif. This particular linear detector has photodiodes arranged in a linear array with the photodiodes disposed at one mil intervals. Of course, other known linear detectors could be used if desired.

Since the linear detector 32 can be quickly read or scanned electronically to determine which photodiode is being activated by a light source, the surface 12 of the airfoil can be quickly inspected. If it is assumed that the maximum curvature or extent of displacement of a point in the arcuate array 26 of points on the surface of the airfoil is one inch, the length of the array of diodes which would be activated by reflected light beams would be at least slightly greater than one inch. In one embodiment of the invention, the complete length of the array of photodiodes could be read 4,000 times a second.

If the lens 30 was ommitted and the reflected light beams 18a–18d were transmitted to a rectangular array of photodiodes, it would be necessary to scan many more diodes in order to determine the curvature of the surface 12. Of course, this would decrease the speed with which the surface 12 could be inspected.

Summary

The present invention enables the curvature of an article, such as the airfoil 14, to be quickly and easily determined without moving the article. To inspect the surface 12 of the airfoil 14, beams of light are directed against each point in a series 26 of points on the stationary curved surface of the airfoil. The beams of light 18a, 18b, 18c and 18d are projected in a predetermined order toward the airfoil 14 along a plurality of paths which are horizontally and vertically offset.

The beams 18a–18d of light are reflected from each of the points 26a–26d on the curved surface 12 in turn along paths which are horizontally and vertically offset. The amount of vertical offset of the reflected beams of light corresponds to the known distance 50 which the beams of light were offset in the vertical direction. The amount of horizontal offset 48 of the reflected beams of light corresponds to the distance at which points 26a–26d on the surface 12 of the article 14 are offset due to the curvature of the surface of the article.

The reflected beams 18a–18d of light are sequentially focused on a linear detector 32. During focusing of the reflected beams of light, the vertical offset 50 between the reflected beams of light is eliminated. The horizontal offset 48 between the reflected beams of light is maintained during focusing on the beams of light on a linear detector 32 by a lens 30. The distance between the points 32a and 32b at which the beams of light 18a and 18b are focused along a straight line 54 on the linear detector 32 corresponds to the distance 48 which the points 26a and 26b on the surface 12 of the article 14 are offset due to curvature of the surface.

The foregoing description has set forth the light beams as being vertically and/or horizontally offset. It is contemplated that the spatial relationship between the mirror 24, airfoil 14, and linear detector 32 may be modified so as to have the light beams offset in other directions. Although the light beams 18a–18d are offset by the same vertical distance, the light beams could be offset by different known vertical distances if desired. In addition, it should be understood that although specific devices have been set forth herein as being capable of use in inspecting a curved surface, other known devices could be used if desired. For example, any light scan device, such as an oscillating mirror or a shutter system, that can direct a beam of light in an accurately known direction, can be used in place of the rotating mirror.

It should also be understood that the points 26 do not have to be measured in a sequence which moves from one point to a next adjacent point. A sequence which moves from one point to a next adjacent point is preferred with a rotating or oscillating mirror. However, a shutter system could scan the points in any random order, as long as that order is known.

Having described specific preferred embodiments of the invention, the following is claimed:

1. A method of inspecting a curved surface on an article, said method comprising the steps of impinging beams of light in a predetermined order against each point in an arcuate series of points on a stationary curved surface by projecting the beams of light in a predetermined order along a plurality of parallel first paths which are offset in a first direction by a known distance, reflecting light beams from each of the points in the series of points in turn along second paths which are offset in the first direction by an amount corresponding to the distance which the first paths are offset in the first direction and which are offset in a second direction transverse to the first direction by an amount corresponding to the distance which the points in the series of points are offset due to curvature of the surface of the article, and eliminating the offset in the first direction between the reflected light beams and maintaining the offset in the second direction between the reflected light beams by sequentially focusing the reflected light beams on a linear detector with the distance between locations at which the reflected light beams are focused on the linear detector corresponding to the distance which the points on the surface in the series of points are offset due to curvature of the surface of the article.

2. A method as set forth in claim 1 wherein said step of focusing the beams of light on the linear detector includes focusing the beams of light on the linear detector with the distance between the locations at which the beams of light are focused being independent of the known distance which the beams of light are offset in the first direction during performance of said step of sequentially projecting beams of light along the first paths.

3. A method of inspecting a curved surface on an article, said method comprising the steps of locating the article with respect to a reference plane having first and second intersecting axes therein such that the curved surface is referenced with respect to a third axis extending through the point of intersection of said intersecting axes, forming beams of light each offset in a common plane and directly impinging such beams without reflection in a predetermined order against each point in a series of points on the curved surface while the surface remains stationary, reflecting light beams from each of the points on the stationary curved surface to form reflected beams offset with respect to each other and to the third axis, focusing the reflected light beams along a straight line on a stationary linear detector, and maintaining the same spatial orientation between the curved surface and the linear detector during performance of the aforementioned method steps.

4. A method as set forth in claim 3 wherein said step of reflecting light beams from the points on the stationary curved surface includes reflecting light beams which are offset by a known amount along the third axis which extends transversely to the straight line along which the reflected light beams are focused and are horizontally offset along one of the intersecting axes which extends parallel to the straight line along which the reflected light beams are focused, said step of focusing the reflected light beams including the step of eliminating the offset of the reflected light beams along the third axis while maintaining the offset of the reflected beams along one of the intersecting axes.

5. A method as set forth in claim 3 further including the step of detecting the locations of opposite edges of the article between which the series of points is disposed by directing light beams in said common plane past the opposite edges onto a secondary linear detector while directly impinging said such beams against each point on said series of points on the curved surface.

6. An apparatus for use in inspecting the curved surface of a stationary article, said apparatus comprising means for directing beams of light each offset in a common plane and in a known order against each point of a series of points on the curved surface of the article, linear detector means for detecting the presence of beams of light which impinge against said linear detector means along a straight line, means for focusing on said linear detector means beams of light reflected from the points in the series of points on the curved surface wherein said reflected beams are offset with respect to each other and to an axis in the common plane, means for holding said curved surface stationary during the directing of beams of light against each point in the series of points on the curved surface, and means for holding said linear detector means stationary during the focusing of beams of light on said linear detector means.

7. An apparatus as set forth in claim 6 wherein said means for directing beams of light against each point in the series of points on the curved surface includes a source of a single beam of light, mirror means for directing the beam of light from said source along a plurality of different paths, and first lens means for directing a beam of light from each of the paths as parallel vertical spaced beams in turn to a different point in the series of points on the curved surface.

8. An apparatus as set forth in claim 7 wherein said means for focusing beams of light on said linear detector means includes second lens means for focusing beams of light which are offset in a direction transverse to a longitudinal axis of said linear detector means on the longitudinal axis at locations which are offset by distances which are a function of the curvature of the arcuate series of points on the curved surface.

9. An apparatus as set forth in claim 6 wherein the beams of light reflected from the points in the series of points on the curved surface are offset along a first axis which extends transversely to a longitudinal axis of said linear detector means and are offset along a second axis which extends parallel to the longitudinal axis of said linear detector means, said means for focusing reflected beams of light on said linear detector means includes means for eliminating the offset of the reflected light beams along the first axis while maintaining the offset of the reflected light beams along the second axis.

* * * * *